United States Patent
Lin

(10) Patent No.: US 9,973,493 B2
(45) Date of Patent: May 15, 2018

(54) AUTOMATIC ELECTRONIC CERTIFICATION TRADING SYSTEM

(71) Applicant: Linctronix Ltd., New Taipei (TW)

(72) Inventor: Yu-shun Lin, New Taipei (TW)

(73) Assignee: LINCTRONIX LTD., New Taipei (TW)

( * ) Notice: Subject to any disclaimer, the term of this patent is extended or adjusted under 35 U.S.C. 154(b) by 152 days.

(21) Appl. No.: 15/243,946

(22) Filed: Aug. 22, 2016

(65) Prior Publication Data

US 2017/0063844 A1    Mar. 2, 2017

(30) Foreign Application Priority Data

Aug. 27, 2015  (TW) .............................. 104128077 A

(51) Int. Cl.
*G06F 9/00*      (2006.01)
*H04L 29/06*     (2006.01)
(Continued)

(52) U.S. Cl.
CPC ...... *H04L 63/0823* (2013.01); *G06F 12/1408* (2013.01); *G06Q 20/32* (2013.01);
(Continued)

(58) Field of Classification Search
CPC ............. H04L 63/0823; G06F 12/1408; G06F 2212/1052; G06Q 20/32; G06Q 20/3224;
(Continued)

(56) References Cited

U.S. PATENT DOCUMENTS 5,695,346 A * 12/1997 Sekiguchi .......... G02B 27/2214
                                                        40/436
7,165,174 B1 * 1/2007 Ginter .................... G06F 21/10
                                                        705/51
(Continued)

FOREIGN PATENT DOCUMENTS

CN         102696048 A      9/2012
CN         103927654 A      7/2014
(Continued)

*Primary Examiner* — Monjour Rahim

(57) ABSTRACT

An automatic electronic certification trading system, comprising: a trading device, a wireless mobile device, an electronic certification import device, an electronic certification server; wherein, the electronic certification server stores a multigroup electronic certification collection, and the electronic certification collection is imported to the trading device through the electronic certification import device or to the trading device by the electronic certification server through wireless network. Next, it is detected if the distance between the wireless mobile device and the trading device entering a set distance or not. If the wireless mobile device enters the set distance, the trading device chooses one or a plurality of electronic certifications from the electronic certification collection and delivers one or a plurality of electronic certifications to the wireless mobile device, so that the user of the wireless mobile device can deliver one or a plurality of electronic certifications of the wireless mobile device to the trading device or other same type of trading devices for identity recognition or/and trading certification.

25 Claims, 15 Drawing Sheets

(51) Int. Cl.
  *G06Q 20/32* (2012.01)
  *G06Q 30/02* (2012.01)
  *G06F 12/14* (2006.01)
  *H04W 12/08* (2009.01)
(52) U.S. Cl.
  CPC ....... *G06Q 20/327* (2013.01); *G06Q 20/3224* (2013.01); *G06Q 20/3278* (2013.01); *G06Q 30/02* (2013.01); *H04W 12/08* (2013.01); *G06F 2212/1052* (2013.01)
(58) Field of Classification Search
  CPC .. G06Q 20/327; G06Q 20/3278; G06Q 30/02; H04W 12/08
  USPC .......................................................... 713/156
  See application file for complete search history.

(56) References Cited

U.S. PATENT DOCUMENTS

| | | | | |
|---|---|---|---|---|
| 2002/0059123 A1* | 5/2002 | Dunning | ................ | G06Q 40/00 705/35 |
| 2002/0198737 A1* | 12/2002 | Valtanen | ................ | G06Q 20/04 705/26.1 |
| 2003/0130961 A1* | 7/2003 | Moret De Rocheprise | ............ | G06Q 20/02 705/78 |
| 2003/0220765 A1 | 11/2003 | Overy | | |
| 2006/0218651 A1* | 9/2006 | Ginter | .................... | G06F 21/00 726/27 |
| 2008/0103716 A1* | 5/2008 | Churan | .................. | G01G 21/26 702/101 |
| 2008/0120240 A1* | 5/2008 | Ginter | .................... | G06F 21/10 705/51 |
| 2009/0070236 A1* | 3/2009 | Cohen | .................... | G06Q 30/00 705/26.1 |
| 2010/0332404 A1* | 12/2010 | Valin | .................. | G06Q 30/0239 705/310 |
| 2014/0025406 A1* | 1/2014 | Zhang | ............. | G06Q 20/38215 705/5 |
| 2014/0052619 A1* | 2/2014 | Luten | ................ | G06Q 30/0601 705/39 |
| 2014/0339306 A1* | 11/2014 | Lin | .................... | G06Q 20/0457 235/385 |
| 2016/0012465 A1* | 1/2016 | Sharp | .................... | G06Q 20/18 705/14.17 |

FOREIGN PATENT DOCUMENTS

| | | |
|---|---|---|
| EP | 2725834 A1 | 4/2014 |
| JP | 2001216449 | 8/2001 |
| JP | 2003203178 | 7/2003 |
| JP | 2010257313 | 11/2010 |
| JP | 2014056283 | 3/2014 |
| JP | 2015060428 | 3/2015 |
| TW | 201342270 A | 10/2013 |

* cited by examiner

AUTOMATIC ELECTRONIC CERTIFICATION TRADING SYSTEM

BACKGROUND OF THE INVENTION

1. Field of the Invention

The present invention relates to an automatic electronic certification trading system, and more particularly, to an automatic electronic certification trading system for detecting a wireless mobile device approaching a trading device in a set distance, and delivering an electronic certification for trading or identity recognition to the wireless mobile device, so that the wireless mobile device processes further certification and trading with the trading device.

2. Description of the Prior Art

The current mechanisms for detecting message approaching and delivery are known as Apple, iBeacon, digital coupons, and vouchers. However, the prior arts still need to deal with entities or entity certification programs to complete the trading or certification after receiving messages from consumers, which is really inconvenient for consumers to conduct online trading and certification anytime and anywhere.

Thus it can be seen that the above mentioned conventional technology has many disadvantages, which is not a good design and needs to be modified.

SUMMARY OF THE INVENTION

In this regards, the inventor of this case engaging in manufacturing development and design of the related product for many years presents a truly practical invention after a detailed design and careful evaluation.

An objective of the present invention is to provide an automatic electronic certification trading system for detecting a wireless mobile device entering into a set distance, and delivering an electronic certification for trading or identity recognition to the wireless mobile device, so that the wireless mobile device processes further certification and/or trading.

To achieve the above mentioned objective, the automatic electronic certification trading system of the present invention mainly comprises: a trading device, a wireless mobile device, an electronic certification import device, and an electronic certification server; wherein the trading device is connected to the electronic certification server through the communication module of the electronic certification import device or the Internet, and imports the electronic certification collection stored in the electronic certification server to the trading device and stores in the trading device. Then, the wireless RF module of the trading device detects the strength of the wireless signal (RSSI) between the trading device and the wireless mobile device and determines whether the position of the wireless mobile device enters a set distance or not. If the wireless mobile device enters the set distance, the trading device chooses one or a plurality of electronic certifications from the imported electronic certification collection, and delivers one or a plurality of electronic certifications to the wireless mobile device. After the wireless mobile device acquires the one or a plurality of electronic certifications, the wireless mobile device can deliver the one or a plurality of electronic certifications to the trading device or other same types of trading devices to process identity recognition or/and trading certification. After the trading device acquires one or a plurality of electronic certifications delivered from the wireless mobile device, the trading device processes the comparison of the one or a plurality of electronic certifications and the electronic certification collection in the trading device to process the trading or identity recognition programs.

The advantages and spirits of the invention may be understood by the following recitations together with the appended drawings.

BRIEF DESCRIPTION OF THE APPENDED DRAWINGS

Some of the embodiments will be described in detail, with reference to the following figures, wherein like designations denote like members, wherein.

DETAILED DESCRIPTION OF THE INVENTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

The present invention relates to an automatic electronic certification trading system. Please refer to FIG. 1, FIG. 2, FIG. 3, FIG. 4, and FIG. 5. The automatic electronic certification trading system of the present invention mainly comprises: a trading device 10, a wireless mobile device 20, and an electronic certification import system 300.

Figure 1:
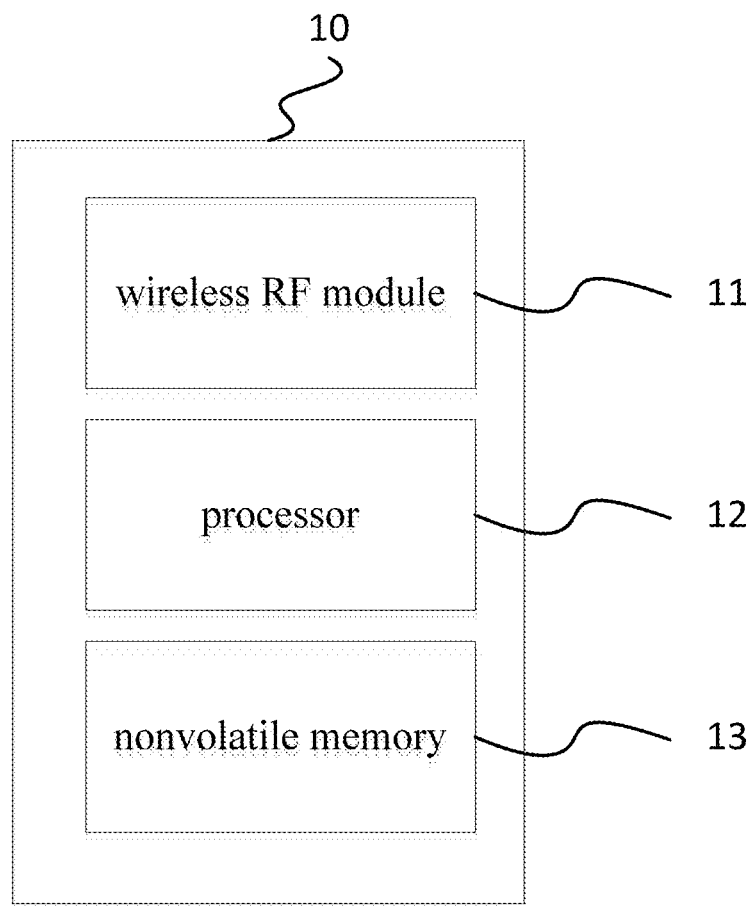
FIG. 1 shows a circuit block diagram of the trading device.

Please refer to FIG. 1. The trading device 10 comprises a wireless RF module 11, a processor 12, and a nonvolatile memory 13. Wherein the wireless RF module can be 2.4 Ghz, 5 GHz, or other kinds of RF module of the wireless communication protocol of ISM (Industrial Scientific Medical Band) spectrum, used as a wireless communication. The implementation of the wireless RF module can be Bluetooth, WiFi, or NFC adapted by existing wireless mobile devices, or communication modules adapting other communication protocols. In the implementation of the module, a single communication protocol module or a multiple communication protocol chip is adapted to design the wireless RF module according to cost or performance requirements.

The nonvolatile memory 13 can be a hard drive, a Flash, EEPROM, or other memory that can store data for a long time. The nonvolatile memory is mainly used for storing the electronic certification collection and the electronic certification data delivered by the trading device and the wireless mobile device. When the electronic certification collection and the electronic certification data delivered by the trading device and the wireless mobile device is stored in the trading device (even if the mobile communication network, PWLAN, or broadband network is disconnected), the system can still maintain the ability of trading or certification, or provide trading or certification services in the area that Internet or communication system cannot provide services.

Figure 2:
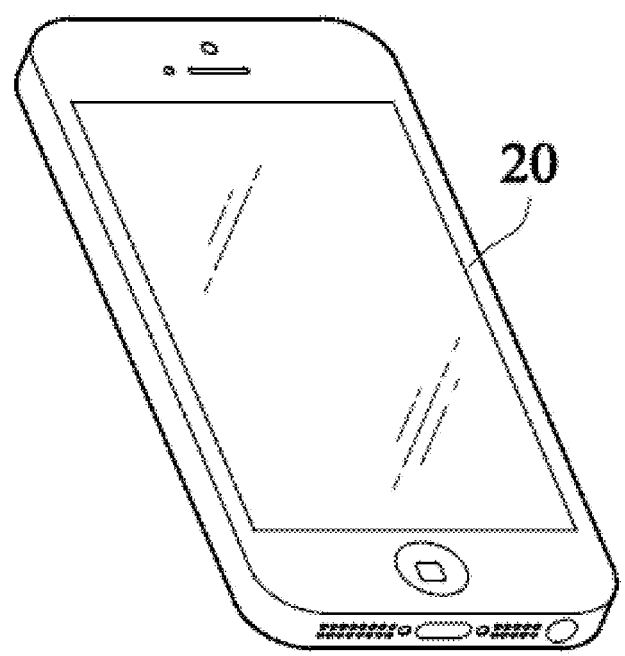
FIG. 2 shows an appearance schematic diagram of the wireless mobile device.

Please refer to FIG. 2. The wireless mobile device 20 can be a mobile phone, a tablet computer, an electronic wearable device, or any kinds of electronic devices that have similar functions and can be carried by the user.

Figure 3:
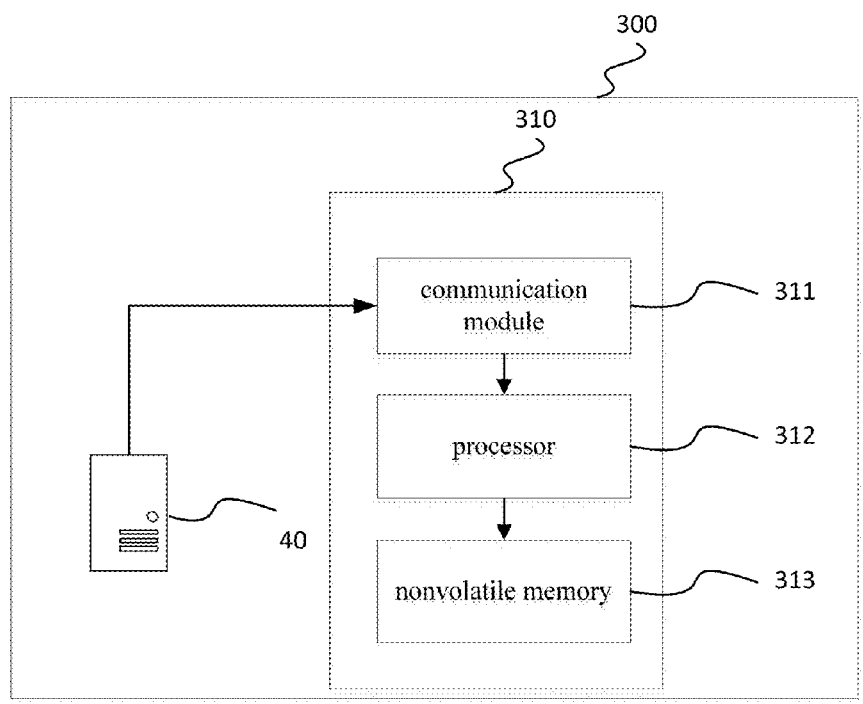
FIG. 3 and FIG. 4 show a flow diagram of the certification import system.
Figure 4:
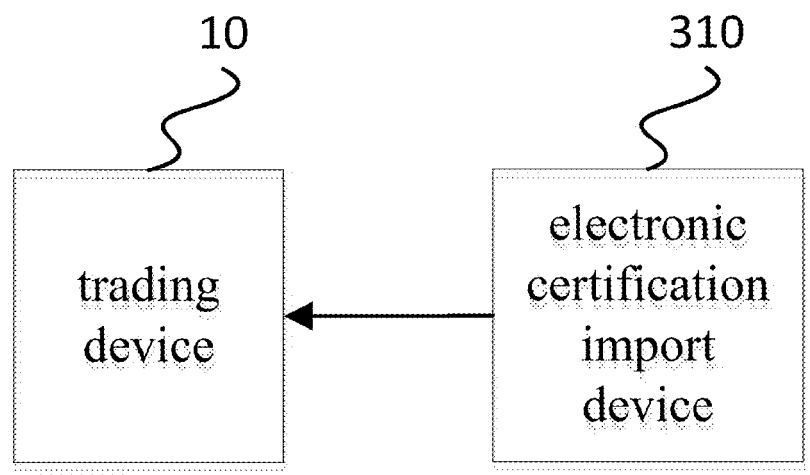

Please refer to FIG. 3. A certification import system 300 comprises a certification import device 310 and an electronic certification server 40, and the certification import device 310 comprises a communication module 311, a processor 312, and a nonvolatile memory 313. Wherein, the certification import device 310 is connected to the electronic certification server 40 through the communication module 311. The electronic certification collection data stored in the electronic certification server is downloaded to the certification import device and stored in the nonvolatile memory 313 by using network file transmission, network database transmission, HTTP, HTTPS, TLS, TCP, or other kinds of communication protocols.

Please refer to FIG. 3. The certification import device 310 delivers the imported electronic certification collection to the trading device 10 through the communication module 311 by using network file transmission, network database transmission, Bluetooth transmission, HTTP, HTTPS, SSH, SSL, TLS, TCP network packet transmission, UDP network packet transmission, or other kinds of communication protocols.

Figure 5:
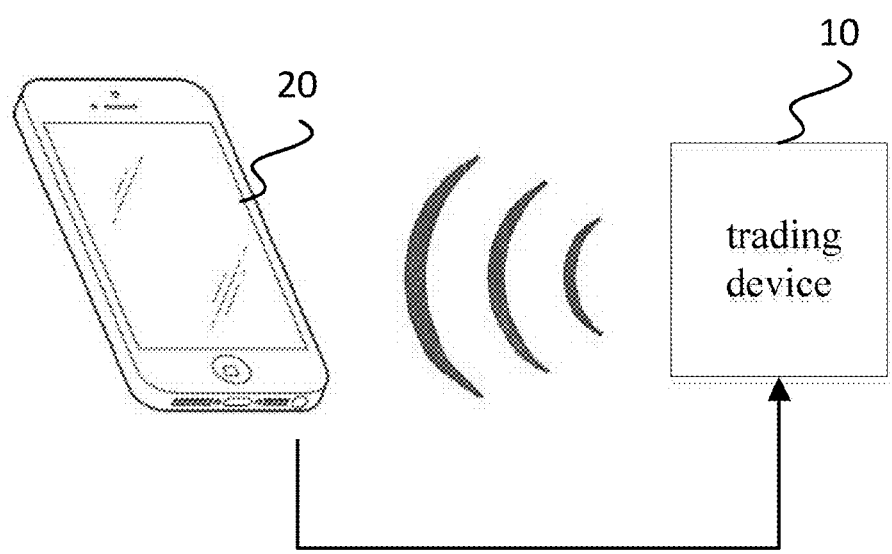
FIG. 5, FIG. 6, FIG. 7 and FIG. 8 show a flow diagram of the electronic certification of the trading system.

Please refer to FIG. 5. When a wireless mobile device 20 approaches to a trading device 10, the strength of the wireless signal (RSSI) between the wireless RF module 11 of the trading device 10 and the wireless mobile device 20 is detected to calculate the distance between the wireless mobile device 20 and the trading device 10 and determine whether the position of the wireless mobile device 20 enters a set distance or not. If the wireless mobile device 20 enters the set distance, the wireless mobile device 20 can establish a communication connection with the wireless RF module 11 of the trading device 10, and the connection can be established by the wireless mobile device 20 or the trading device 10 actively. The trading device 10 chooses one or a plurality of electronic certifications from the electronic certification collection stored in the nonvolatile memory 13 of the trading device 10 after connecting, and delivers the one or a plurality of electronic certifications to the wireless mobile device 20 through the connection.

After the wireless mobile device 20 acquires the one or a plurality of electronic certifications, the user of the wireless mobile device 20 can establish the connection with the wireless RF module of the trading device 10 or other trading device with same functions through the wireless mobile device 20 and deliver an electronic certification to the trading device 10 or other trading device with same functions through the connection, and the trading device 10 or other trading device with same functions processes identity recognition or/and trading certification; wherein the identity recognition or/and trading certification program is the trading device 10 or other trading device with same functions processing the comparison of the one or a plurality of electronic certifications delivered by the wireless mobile device 20 and the electronic certification collection stored in the nonvolatile memory 13 of the trading device 10 to confirm whether the delivered one or a plurality of electronic certifications is consistent with the corresponding data of the stored electronic certification collection or not to process the subsequent indicating program.

Please refer to FIG. 1, FIG. 2, FIG. 6, and FIG. 7. Another embodiment of the present invention is an automatic electronic certification trading system, mainly comprising a trading device 10, a wireless mobile device 20, and an electronic certification server 40.

Please refer to FIG. 1. The trading device 10 comprises a wireless RF module 11, a processor 12, and a nonvolatile memory 13.

Please refer to FIG. 2. The wireless mobile device 20 can be a mobile phone, a tablet computer, an electronic wearable device, or any other kinds of electronic devices that have similar functions and can be carried by the user.

The electronic certification server 40 is located on a remote spot, and the electronic certification server 40 can establish network connection with the trading device 10 directly in the same enterprise network or Internet belonging to different network areas from the trading device 10.

The trading device can be connected to the virtual network or enterprise entities' internal network, broadband network, wireless mobile network, or other public or private network through the wireless RF module 11 of the trading device 10 to establish communication connection with the electronic certification server 40 to acquire the electronic certification collection stored in the electronic certification server 40 for processing the subsequent action. The trading device and the electronic certification server can be in the same enterprise network environment, such as virtual network or entities' private network connection, and the trading device 10 can establish network connection with the electronic certification server 40 directly; the trading device 10 can also establish network connection with the electronic certification server 40 through broadband network or Internet service provided by wireless mobile ISP.

Figure 6:
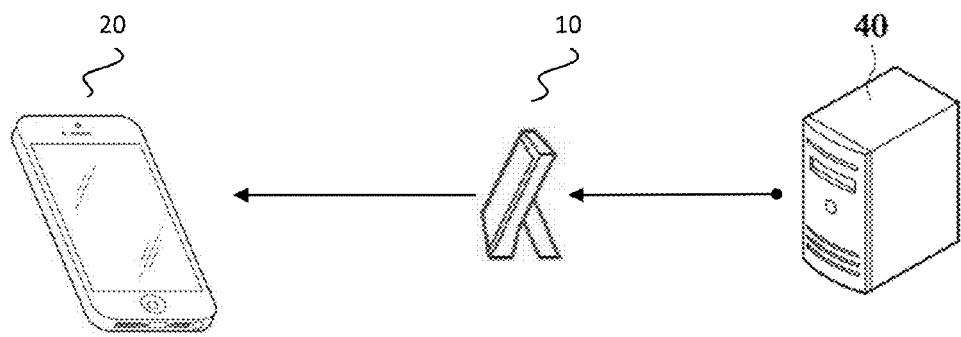

Please refer to FIG. 6. When a wireless mobile device 20 approaches to a trading device 10, the strength of the wireless signal (RSSI) between the wireless RF module 11 of the trading device 10 and the wireless mobile device 20 is detected to calculate the distance between the wireless mobile device 20 and the trading device 10 and determine whether the position of the wireless mobile device 20 enters a set distance or not. If the wireless mobile device 20 enters the set distance, the wireless mobile device 20 can establish a communication connection with the wireless RF module 11 of the trading device 10, and the connection can be established by the wireless mobile device 20 or the trading device 10 actively, and the trading device 10 delivers one or a plurality of electronic certifications to the wireless mobile device 20 through the connection; wherein the one or a plurality of electronic certifications can be acquired from the electronic certification server instantly by the trading device 10 establishing connection with the electronic certification server 40, or chosen from the electronic certification collection acquired by the electronic certification server 40 in advance, and the electronic certification collection acquired by the electronic certification server 40 in advance is stored in the nonvolatile memory 13 of the trading device 10 temporally.

Figure 7:
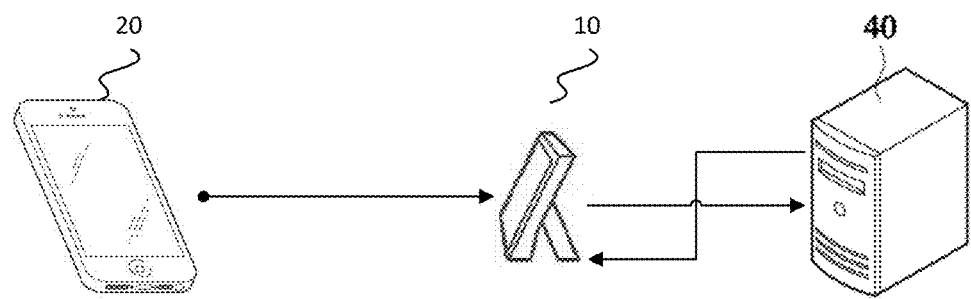

Please refer to another embodiment shown in FIG. 7. After the wireless mobile device 20 acquires the one or a plurality of electronic certifications, the user of the wireless mobile device 20 can establish the connection with the wireless RF module 11 of the trading device 10 and deliver the one or a plurality of electronic certifications to the trading device 10 through the connection. After the trading device 10 receives the one or a plurality of electronic certifications, the trading device 10 forwards the one or a plurality of electronic certifications to the electronic certification server 40, and the electronic certification server 40 processes electronic certification discrimination to complete trading or identity recognition program and forwards the result of the discrimination back to the trading device to process the subsequent indicating program.

Please refer to FIG. 1, FIG. 2, FIG. 7, and FIG. 8. An embodiment of the present invention is an automatic electronic certification trading system mainly comprising: a trading device 10, a wireless mobile device 20, and an electronic certification server 40.

Please refer to FIG. 1. The trading device 10 comprises a wireless RF module 11, a processor 12, and a nonvolatile memory 13.

Please refer to FIG. 2. The wireless mobile device 20 can be a mobile phone, a tablet computer, an electronic wearable device, or any other kinds of electronic devices that have similar functions and can be carried by the user.

The electronic certification server is located on a remote spot, and the electronic certification server can establish network connection with the trading device 10 directly in the same enterprise network or Internet belonging to different network areas from the trading device 10.

When a wireless mobile device 20 approaches to a trading device 10, the strength of the wireless signal (RSSI) between the wireless RF module 11 of the trading device 10 and the wireless mobile device 20 is detected to calculate the distance between the wireless mobile device 20 and the trading device 10 and determine whether the position of the wireless mobile device 20 enters a set distance or not.

Figure 8:
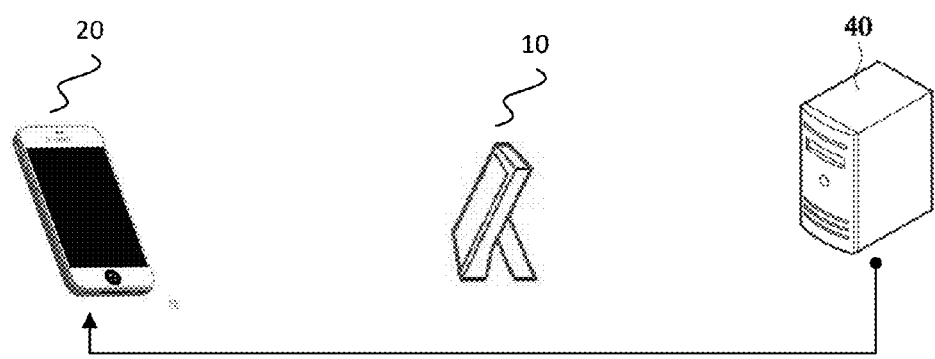

Please refer to FIG. 8. If the wireless mobile device 20 enters the set distance, the wireless mobile device 20 can establish a communication connection with the electronic certification server 40 through HPRS wireless mobile communication network, WCDMA wireless mobile communication network, 3G wireless mobile communication network, LTE wireless mobile communication network, LTE+ wireless mobile communication network, 4G wireless mobile communication network, WiFi public wireless mobile communication network, or other communication connection ways, and the electronic certification server 40 delivers one or a plurality of electronic certifications for trading or/and identity recognition to the wireless mobile device 20.

Please refer to FIG. 7. After the wireless mobile device 20 acquires the certification, the user of the wireless mobile device 20 can establish the connection with the wireless RF module 11 of the trading device 10 through the wireless mobile device 20 and deliver one or a plurality of electronic certifications to the trading device 10 through the connection. After the trading device 10 receives the one or a plurality of electronic certifications, the trading device 10 forwards the one or a plurality of electronic certifications to the electronic certification server 40, and the electronic certification server 40 processes electronic certification discrimination and forwards the result of the discrimination back to the trading device to process the subsequent indicating program.

In the above mentioned embodiment of the present invention, the set distance means that the trading device 10 is the origin and a system default specific length is the radius, and the distance is between the wireless mobile device 20 and the trading device 10. The maximum system default specific length can be 30 m and the minimum system default specific length can be 0.1 m.

In the above mentioned embodiment of the present invention, the detection and conversion method of the strength of the wireless signal (RSSI) can be the trading device 10 sending specific broadcast packet. After the wireless mobile device 20 receives the broadcast packet, the strength of wireless signal (RSSI) is detected, and the wireless mobile device 20 can forward the strength of wireless signal back to the trading device 10 or convert a distance through the strength of wireless signal and then forward back to the trading device 10.

The trading device 10 receives the returned data through the wireless RF module 11 of the trading device 10 and processes discrimination. If the data is a strength of wireless signal, then convert the strength of wireless signal to a converted distance. If the data is a returned distance, then use directly. The trading device 10 uses the converted distance or the returned distance to determine whether the wireless mobile device 20 enters the set distance of the trading device or not. If the wireless mobile device 20 enters the set distance of the trading device, then the trading device 10 processes the subsequent electronic certification transmission and trading and identity recognition program of the above mentioned embodiment.

In the above mentioned embodiment of the present invention, the detection and conversion method of the strength of the wireless signal (RSSI) can be the wireless mobile device 20 sending specific broadcast packet. After the trading device 10 receives the broadcast packet, the strength of wireless signal (RSSI) is detected, and the distance between the wireless mobile device 20 and the trading device 10 is converted. If the wireless mobile device 20 enters the set distance of the trading device, then the trading device 10 processes the subsequent electronic certification transmission and trading and identity recognition program of the above mentioned embodiment.

In the above mentioned embodiment of the present invention, whether the wireless mobile device 20 enters the set distance can be determined by a background location server 60, and the background location server 60 is located on a remote spot and can be in the same enterprise network or Internet. The background location server 60 stores the following information:

There is one or a plurality of identification numbers of the trading device, and each identification number of the trading device is corresponded to a trading device to identify the identity of the trading device only. The data type of the identification number of the trading device can be a MAC code, a trading device number, a trading device location code, or other identification number that can identify a plurality of trading devices.

There is one or a plurality of the trading device locations, and each identification number of the trading device is corresponded to a physical location to represent the location of the trading device. The physical location can be a relative coordinate of building floor plan, a latitude and longitude coordinate, or a latitude and longitude coordinate with height.

There is one or a plurality of identification numbers of the wireless device, and each identification number of the wireless device is corresponded to a wireless device to identify the identity of the wireless device only; the data type of the identification number of the wireless device can be a mobile phone number, a mobile phone IMEM code, or derivative code through specific encoding based on the above mentioned data type.

There is one or a plurality of paired identification numbers, and each paired identification number comprises an identification number of the wireless device, an identification number of the trading device, a strength of the wireless signal, and a distance.

There is a set distance of one or a plurality of trading devices and all kinds of algorithms which convert strength of the wireless signal to distance.

If the background location server 60 receives a network packet, and the network packet comprises the identification number of the trading device, the identification number of the wireless device, the strength of the wireless signal, and other ancillary information, then the background location server 60 acquires the distance through the algorithm to convert strength of the wireless signal to distance and stores the identification number of the wireless device, the identification number of the trading device, the strength of the wireless signal, and the distance into the paired identification numbers for the subsequent use. Next, the background location server determines whether the wireless device corresponded to the identification number of the wireless device enters the set distance of the trading device corresponded to the identification number of the trading device, and then forwards the result back to the trading device corresponded to the identification number of the trading device.

If the background location server 60 receives a plurality of network packets comprising an identification number of the wireless device and the identification numbers of the different trading devices, the background location server 60 can adopt two-point location method, triangulation location, cellular location, or other multiple reference coordinates location algorithm to exactly locate the position in space of the wireless device corresponded to the identification number of the wireless device after calculating. Next, the background location server determines whether the wireless device corresponded to the identification number of the wireless device enters the set distance of the trading devices corresponded to the identification numbers of one or a plurality of trading devices by the position, and then selects the one or a plurality of trading devices entering the set distance and forwards the result back to the trading device corresponded to the identification number of the trading device.

Figure 9:
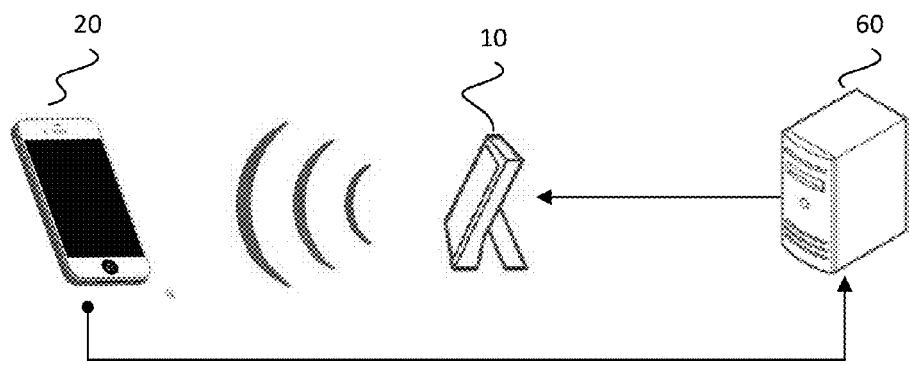
FIG. 9, FIG. 10 and FIG. 11 show a flow diagram of location and range setting.

Please refer to FIG. 9. The trading device 10 delivers a broadcast packet comprising the identification number of the trading device periodically. After the wireless mobile device 20 approaches the trading device 10 to the distance that can receive the signal of the broadcast packet, the wireless mobile device delivers all or partial content of the received broadcast packet, the strength data of the signal received by the wireless mobile device 20, the identification number of the trading device, and the identification number of the wireless device to the background location server 60 through HPRS public wireless communication network, WCDMA public wireless communication network, 3G public wireless communication network, LTE public wireless communication network, LTE+ public wireless communication network, 4G public wireless communication network, WiFi public wireless communication network, or other communication ways. The background location server 60 determines whether the wireless mobile device 20 enters the set distance of the trading device 10 after receiving the data, and informs the trading device 10 of the result. The trading device 10 processes the subsequent electronic certification transmission and trading and identity recognition program of the above mentioned embodiment according to the result.

Figure 10:
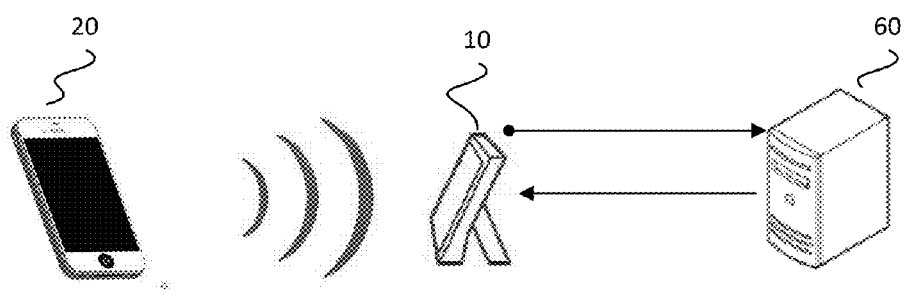

Please refer to FIG. 10. The wireless mobile device 20 delivers the broadcast packet comprising the identification number of the wireless device periodically. After the wireless mobile device 20 approaches the trading device 10 so that the trading device 10 can receive the signal of the broadcast packet delivered by the wireless mobile device 20, the trading device 10 is connected to the background location server 60 to deliver all or partial content of the broadcast packet received by the trading device 10, the strength data of the signal received by the trading device 10, and the identification number of the wireless device to the background location server 60 through the wireless RF module 11 of the trading device 10. The background location server 60 determines whether the wireless mobile device 20 enters the set distance of the trading device 10 after receiving the data, and informs the trading device 10 of the result. The trading device 10 processes the subsequent electronic certification transmission and trading and identity recognition program of the above mentioned embodiment according to the result.

Figure 11:
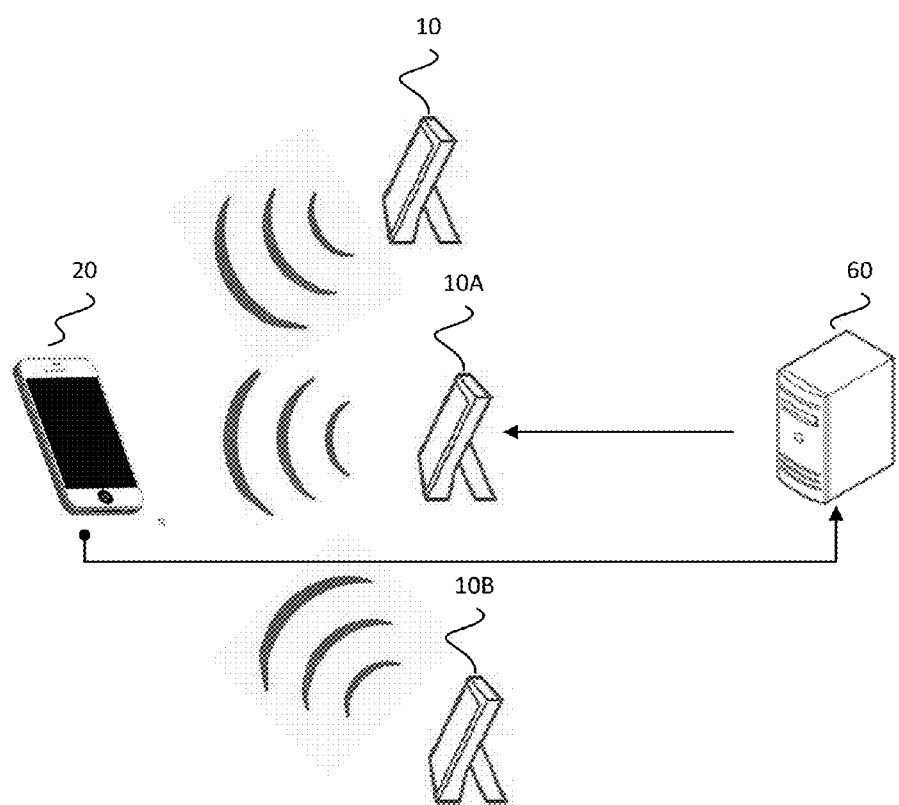

Please refer to a plurality of trading device 10, trading device 10A, trading device 10B (or more trading devices with similar functions) shown in FIG. 11. Each trading device delivers broadcast packet periodically, and the broadcast packet delivered by each trading device comprises the identification number corresponded to itself. After a wireless mobile device approaches the trading device to the distance that can receive the signal of the broadcast packet delivered by any or a plurality of trading devices, the wireless mobile device delivers all or partial content of the received broadcast packet of all or part of the trading devices, the strength data of the signal received by the wireless mobile device 20, the identification number of the wireless mobile device to the background location server 60. The background location server 60 uses the plurality of the strength of the wireless signal to calculate the position of the wireless mobile device 20 and determines whether the wireless mobile device 20 enters the set distance of the one or a plurality of trading devices. If the background location server 60 determines the wireless mobile device 20 enters the set distance of the one or a plurality of trading devices, and informs one of the one or a plurality of trading devices to processes the subsequent electronic certification transmission and trading and identity recognition program of the above mentioned embodiment according to the result.

In the above mentioned embodiment of the present invention, after the background location server 60 determines the wireless mobile device 20 enters the set distance of the trading device 10, the background location server 60 delivers the converted distance data of the distance between the mobile device 20 and the trading device 10 to the trading device 10 through the communication connection with the trading device 10. The trading device determines whether to accept or refuse the connection request of trading or identity recognition of the wireless mobile device 20 according to the distance data.

In another embodiment of the present invention, an automatic electronic certification trading system of the present invention mainly comprising: a Bluetooth trading device 50, a wireless mobile device 20, and an electronic certification server 40. The Bluetooth protocol is a wireless communication protocol of short distance, so there is no need to set distance again due to the feature of the protocol. When the wireless mobile device approaches the Bluetooth trading device into the distance that can establish Bluetooth connection, the feature of the set distance is existed.

Figure 12:
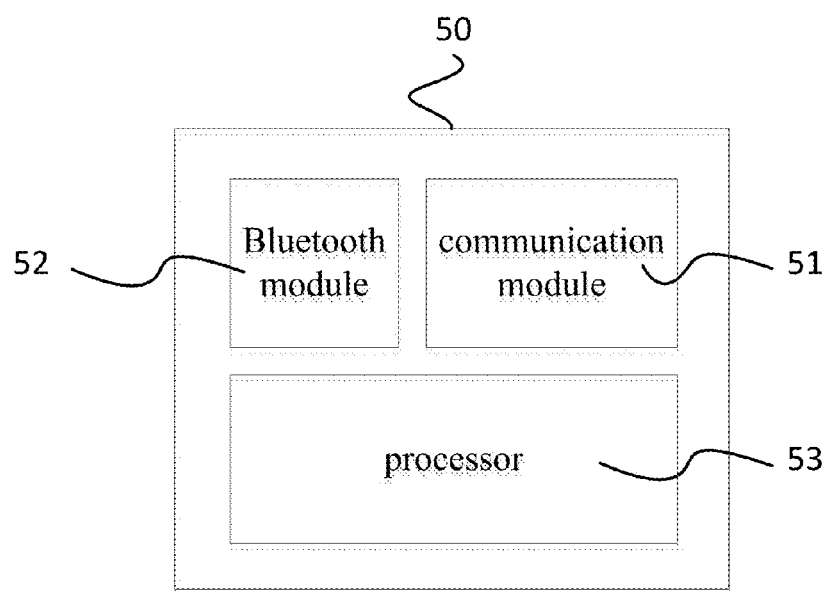
FIG. 12 shows a circuit block diagram of the Bluetooth trading device.

Please refer to FIG. 12, wherein the Bluetooth trading device 50 comprises: a wireless communication module 51, a Bluetooth communication module 52, and a processor 53. The wireless communication module can be WiFi module or wireless mobile communication network (GSM, GPRS, WCDMA, CDMA2000, Wimax, LTE, LTE+, LTE-A) module. The Bluetooth communication module can be a standard Bluetooth or Bluetooth low-power consumption module.

Please refer to FIG. 2. The wireless mobile device 20 can be a mobile phone, a tablet computer, an electronic wearable device, or any other electronic device that has similar functions and can be carried by the user.

The electronic certification server is located on a remote spot and can establish network connection with the trading device 50 directly in the same enterprise network or Internet belonging to different network areas from the trading device 50.

Figure 13:
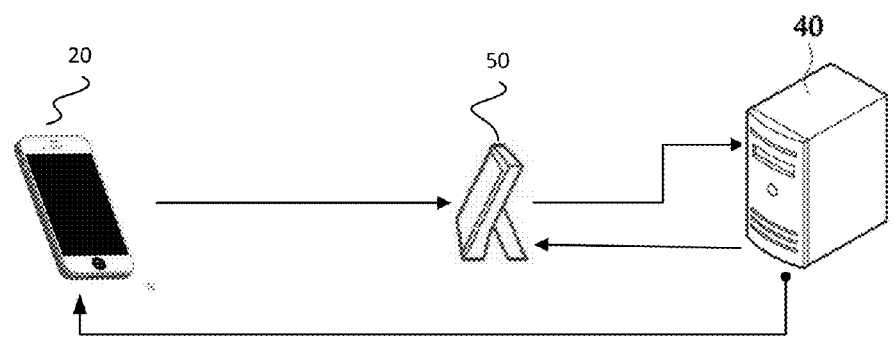
FIG. 13 and FIG. 14 show a flow diagram of the electronic certification of the Bluetooth trading system.

Please refer to FIG. 13. The wireless mobile device 20 establishes a communication connection with the electronic certification server 40 through public WiFi or HPRS wireless mobile communication network, WCDMA wireless mobile communication network, 3G wireless mobile communication network, LTE wireless mobile communication network, LTE+ wireless mobile communication network, 4G wireless mobile communication network, or other communication connection ways, and the electronic certification server 40 delivers one or a plurality of electronic certifications for trading or identity recognition to the wireless mobile device 20. The electronic certification server 40 can deliver the one or a plurality of electronic certifications to the wireless mobile device through the Bluetooth trading device 50, wherein the Bluetooth trading device 50 receives one or a plurality of electronic certifications delivered by the wireless mobile device through the Bluetooth communication module 52 of the Bluetooth trading device 50.

After the Bluetooth trading device 50 receives the one or a plurality of electronic certifications, the Bluetooth trading device 50 forwards the one or a plurality of electronic certifications to the electronic certification server 40 through the wireless communication module 51 of the Bluetooth trading device 50, and the electronic certification server 40 processes the electronic certification program, and forwards the result back to the Bluetooth trading device 50 to process the subsequent trading or identity recognition program.

Figure 14:
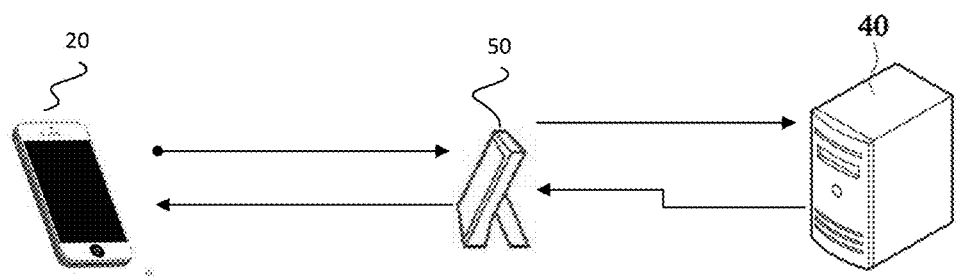

Please refer to FIG. 14. After the wireless mobile device 20 delivers the electronic certification to the Bluetooth trading device 50, the Bluetooth trading device 50 forwards the electronic certification to the electronic certification server 40, and the electronic certification server 40 can set certain conditions in the procedure of determining the electronic certification. When the certain conditions are achieved, the electronic certification server 40 delivers another one or a plurality of updated electronic certification to the Bluetooth trading device 50, and the Bluetooth trading device 50 delivers the one or a plurality of updated electronic certification to the wireless mobile device 20. In the embodiment, changing or replacing gifts by gift coupon or shopping voucher of the electronic certification trading is described below. If the denomination of electronic certification trading of shopping voucher is larger than the value of trading object, the electronic certification server 40 can issue an updated electronic certification trading of shopping voucher containing the amount of money after deducting the value of trading object. When replacing gifts, an electronic certification containing gifts is issued to maintain the consistency in the trading and to reduce account problems and manual operation.

In the above mentioned embodiment of the present invention, the trading or the identity recognition program can deliver real-time data of the trading program, operation instruction, or other information through an indicating unit.

The indicating unit can be a display set on the trading device 10, an audio equipment set on the trading device 10, a computer equipped with display, a mobile phone, a tablet computer, or an electronic outfit. After the trading or the identity recognition program is complete, the indicating unit is used to deliver the result of the trading or identity recognition in visual or audio ways. For example, the indicating unit is used to deliver a sign of success/failure of the trading or identity recognition in visual or audio ways. The trading device 10 can be connected to the indicating unit to deliver the real-time data of the trading program, operation instruction, or other information through the wireless RF module of the trading device 10 or other communication transmission ways. The trading device 10 can be connected to the indicating unit to deliver real-time data of the trading program, operation instruction, or other information by an indicating unit through the wireless RF module 11 of the trading device 10 or other communication transmission ways.

Figure 15:
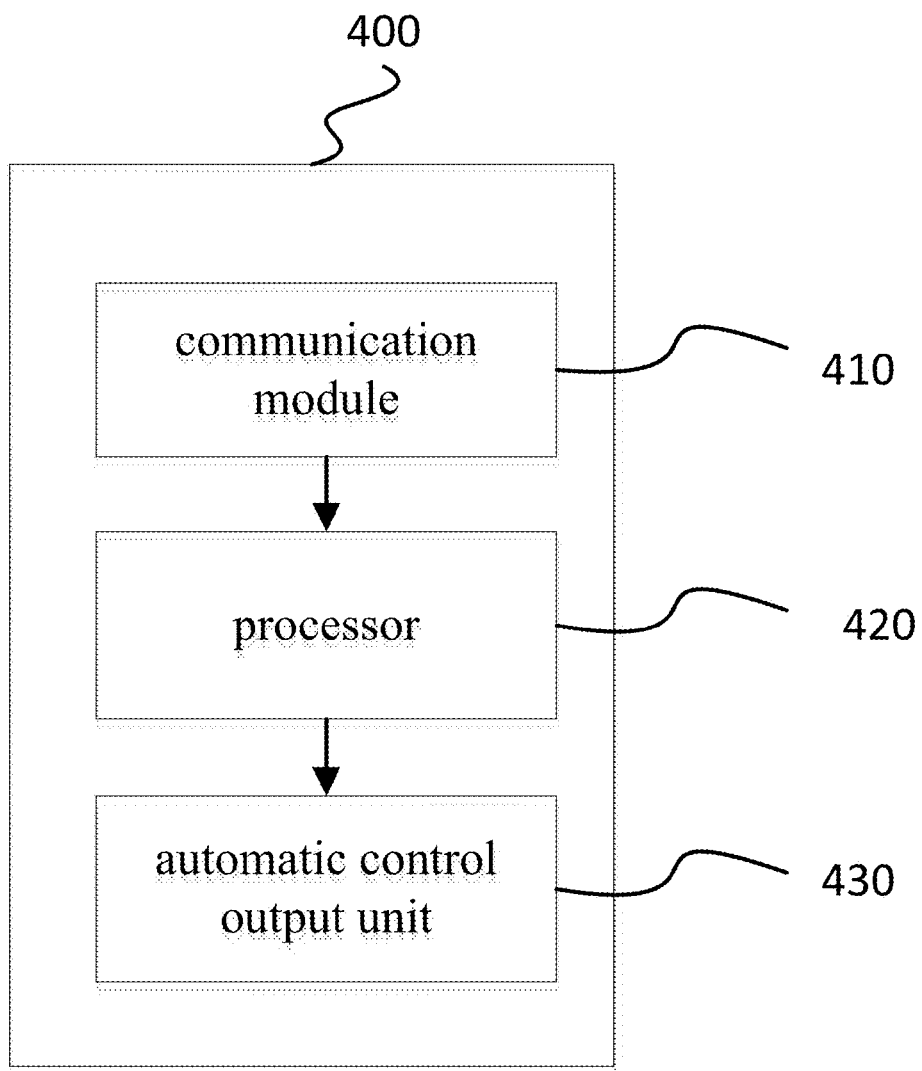
FIG. 15 shows a circuit block diagram of the indicating unit.

Please refer to FIG. 15. An action indicating unit 400 comprises a communication module 410, a processor 420, and an automatic control output unit 430.

In the program of trading or identity recognition, the trading device 10 can inform the action indicating unit 400 of the related information about trading and identity recognition through the communication module 410. According to the information, an action command can be delivered through the communication module 410 or the automatic control output unit 430 to make a command receiving end action or operation. The command receiving end can be a POS store cashier system, a credit card or an ATM card management system, an electronic wallet trading sensing system, an access control system, an automatic controller, a motor, a mechanical arm, a hydraulic machinery equipment, a pneumatic machinery equipment, a power switch, a fan speed controller, a beeper, an electronic valve, or an electronic access control, which can receive automatic control commands or digital/analog control equipment. Practical applications include POS system trading informing, credit card/ATM card deduction, electronic wallet deduction, building access control switch, or parking lot valve switch.

In the program of trading or identity recognition, the trading device 10 can inform a command receiving end of processing action or operation through the wireless RF module. The command receiving end can be a POS store cashier system, a credit card or ATM card management system, an electronic wallet trading sensing system, an access control system, an automatic controller, a motor, a mechanical arm, a hydraulic machinery equipment, a pneumatic machinery equipment, a power switch, a fan speed controller, a beeper, an electronic valve, or an electronic access control, that can receive automatic control command or digital or analog control equipment. Practical applications are such as POS system trading informing, credit card/ATM card deduction, electronic wallet deduction, building access control switch, or parking lot valve switch.

If the trading or identity recognition is processed by the electronic certification server 40 or the remote certification server 320, then the result is forwarded through the connection between the electronic certification server 40 and the trading device 10 or the Bluetooth trading device 50. The trading device 10 or the Bluetooth trading device 50 delivers the result to the indicating unit or the action indicating unit 400 through the wireless RF module 11, the wireless communication module 51, or the Bluetooth communication module 52 of the trading device 10 or the Bluetooth trading device 50. If the trading or identity recognition program is processed by the trading device 10 or the Bluetooth trading device 50, then the result is delivered to the indicating unit or the action indicating unit 400 through the wireless RF module 11, the wireless communication module 51, the Bluetooth communication module 52 of the trading device 10 or the Bluetooth trading device 50.

In the embodiment of the present invention, the certification of the trading or identity recognition can be implemented by TDM (time division multiplexing) or OFDM (orthogonal frequency division multiplexing) through the wireless RF module 11 or the Bluetooth communication module 52. TDM or OFDM can support more than one wireless mobile device 20 establishing connection with the trading device 10 or the Bluetooth trading device 50 simultaneous to process the trading or identity recognition of the electronic certification. At the same time, the maximum number of the connections is based on the implementation chip of the wireless RF module 11, d the Bluetooth communication module 52 and the wireless communication protocol of each module.

In the embodiment of the present invention, the electronic certification is encrypted data, and the content of the electronic certification can contain, but not limited to, following types of the electronic certification—electronic signatures of identities, electronic signatures of trading, electronic empowerments, electronic coupons, electronic vouchers, cash coupons, electronic point tickets, electronic redemptions, electronic receipts, and all kinds of data with different properties derived from the above mentioned types.

In the embodiment of the present invention, the electronic certification is encrypted data, and the content of the electronic certification is linked to another database through electronic certification data. The database contains the types and related properties represented by the electronic certification. The types of the electronic certification contain, but not limited to, electronic signatures, electronic empowerments, electronic coupons, electronic vouchers, cash coupons, electronic point tickets, electronic redemptions, electronic receipts, and all kinds of data with different properties derived from the above mentioned types.

The present invention further comprises a display indicating unit (not shown in the figure) comprising a mobile phone, a tablet computer, a computer equipped with display, an electronic outfit, a display set on the trading device, wherein after completing trading or recognition program, the display indicating unit shows the result of the trading or recognition visually.

The present invention further comprises an action receiver unit (not shown in the figure), wherein the action receiver unit comprises a communication module; after completing the trading or recognition program, the trading device sends a control command to the action receiver unit according to the result of the trading or recognition via the wireless RF module of the trading device through wireless mobile network or wireless network.

The relationship between the strength of the wireless signal and the distance, and all kinds of multiple reference point location algorithms can refer to the algorithms discussed in academic papers. The present invention, supplemented by other papers for implementation, mainly refers to the following papers: Algorithms for Location Estimation Based on RSSI Sampling, Charalampos Papamanthou, Franco P. Preparata, and Roberto Tamassia Department of Computer Science and Center for Geometric Computing Brown University; Approximation Algorithms for Facility Location Problems, Jens Vygen, Research Institute for Discrete Mathematics, University of Bonn Lennestrae 2, 53113 Bonn, Germany; Bluetooth Indoor Positioning, Master of Computer Science, Submitted by Anja Bekkelien, supervised by Dr. Michel Deriaz, Dr. Stephane Marchand-Maillet University of Geneva.

In conclusion, the automatic electronic certification trading system of the present invention has unprecedented and innovative characteristics, which are not revealed in any publications; moreover, there are not any similar products on the market nowadays. Therefore, it is undoubtedly that the present invention is novel. Besides, conventional technology is not comparable with the unique characteristics and functions of the present invention, so the present invention is progressive compared with conventional technology. In this regards, the present invention conforms with the conditions of the application for the invention patent in our country, the applicant thus applies for a patent in accordance with the law.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An automatic electronic certification trading system, comprising:
    a trading device, wherein the trading device comprises: a processor, a wireless RF module, and a nonvolatile memory for storing data;
    a wireless mobile device, wherein the wireless mobile device comprises: a wireless RF module and a processor;
    an electronic certification import device, wherein the electronic certification import device comprises: a processor, a communication module, a nonvolatile memory for storing data; and
    an electronic certification server, wherein the electronic certification server stores electronic certification collection containing a plurality of electronic certification data;
    wherein the electronic certification import device is connected to the electronic certification server through the communication module and loads the electronic certification collection to the electronic certification import device; then the electronic certification import device imports the electronic certification collection to the trading device through Internet transmission or wireless transmission via the communication module;
    wherein the trading device is configured with a set distance, and a strength of the wireless signal (RSSI) between the trading device and the wireless mobile device is detected by the wireless RF module of the trading device or the wireless RF module of the wireless mobile device and converted to determine whether the position of the wireless mobile device enters the set distance of the trading device or not; if the wireless mobile device enters the set distance, at least one electronic certification chosen from the electronic certification collection by the trading device is sent to the wireless mobile device through the wireless RF module.

2. The automatic electronic certification trading system of claim 1, wherein when the user of the wireless mobile device receives at least one electronic certification, the user can connect to the wireless RF module of the trading device through the wireless device, and deliver the at least one electronic certification to the trading device for identity recognition or/and trading certification program corresponding to the at least one electronic certification.

3. The automatic electronic certification trading system of claim 1, further comprising more than one same type trading device, wherein the same type trading device comprises the same structure as the trading device and stores the same electronic certification collection and electronic certification data as the trading device; wherein when the user of the wireless mobile device receives at least one electronic certification, the user can connect to the wireless RF module of the trading device or any one of the same type trading devices through the wireless device, and deliver the at least one electronic certification to the trading device for identity recognition or/and trading certification program corresponding to the at least one electronic certification.

4. The automatic electronic certification trading system of claim 1, 2, or 3, wherein the set distance can be a certain value between 0.1 m to 30 m.

5. The automatic electronic certification trading system of claim 2 or 3, further comprising a display indicating unit comprising a mobile phone, a tablet computer, a computer equipped with display, an electronic outfit, a display set on the trading device, wherein after the trading or recognition program, the display indicating unit shows the result of the trading or recognition visually.

6. The automatic electronic certification trading system of claim 2 or 3, further comprising an action receiver unit, wherein the action receiver unit comprises a communication module; after the trading or recognition program, the trading device sends control command to the action receiver unit according to the result of the trading or recognition via the wireless RF module of the trading device through wireless mobile network or wireless network.

7. The automatic electronic certification trading system of claim 2 or 3, further comprising an action indicating unit, wherein the action indicating unit comprises a processor, a communication module, and an automatic control output unit; wherein the action indicating unit acquires the result of the trading or recognition by communicating with the trading device through the communication module, and the automatic control output unit outputs control signal to outside according to the result of the trading or recognition.

8. An automatic electronic certification trading system, comprising:
a trading device, wherein the trading device comprises: a processor and a wireless RF module;
a wireless mobile device, wherein the wireless mobile device comprises: a wireless RF module and a processor; and
an electronic certification server, wherein the electronic certification server stores electronic certification collection containing a plurality of electronic certification data;
wherein the electronic certification import device is connected to the electronic certification server through the communication module and loads the electronic certification collection to the electronic certification import device; then the electronic certification import device imports the electronic certification collection to the trading device through Internet transmission or wireless transmission via the communication module;
wherein the trading device is configured with a set distance, and a strength of the wireless signal (RSSI) between the trading device and the wireless mobile device is detected by the wireless RF module of the trading device or the wireless RF module of the wireless mobile device and converted to determine whether the position of the wireless mobile device enters the set distance of the trading device or not; if the wireless mobile device enters the set distance, the wireless mobile device establishes connection with the electronic certification server via the wireless RF module of the wireless mobile device through wireless mobile network or wireless network and acquires at least one electronic certification through the connection; wherein when the user of the wireless mobile device receives at least one electronic certification, the user can connect to the wireless RF module of the trading device through the wireless device and deliver the at least one electronic certification to the trading device.

9. An automatic electronic certification trading system, comprising:
a same type trading device, wherein the same type trading device comprises: a processor and a wireless RF module;
a wireless mobile device, wherein the wireless mobile device comprises: a wireless RF module and a processor; and
an electronic certification server, wherein the electronic certification server stores electronic certification collection containing a plurality of electronic certification data;
wherein the same type trading device is configured with a set distance, and a strength of the wireless signal (RSSI) between the trading device and the wireless mobile device is detected by the wireless RF module of the same type trading device or the wireless RF module of the wireless mobile device and converted to determine whether the position of the wireless mobile device enters the set distance of any one of the same type trading devices or not; if the wireless mobile device enters the set distance, the wireless mobile device establishes connection with the electronic certification server via the wireless RF module of the wireless mobile device through wireless mobile network or wireless network and acquires at least one electronic certification through the connection; wherein when the user of the wireless mobile device receives at least one electronic certification, the user can connect to the wireless RF module of the trading device or any one of the same type trading devices through the wireless device and deliver the at least one electronic certification to the trading device or the same type trading devices.

10. An automatic electronic certification trading system, comprising:
a trading device, wherein the trading device comprises: a processor and a wireless RF module;
a wireless mobile device, wherein the wireless mobile device comprises: a wireless RF module and a processor; and
an electronic certification server, wherein the electronic certification server stores electronic certification collection containing a plurality of electronic certification data; wherein the trading device establishes connection with the electronic certification server through the wireless RF module of the trading device, and the electronic certification collection data is acquired through the connection; wherein the trading device is configured with a set distance, and a strength of the wireless signal (RSSI) between the trading device and the wireless mobile device is detected by the wireless RF module of the trading device or the wireless RF module of the wireless mobile device and converted to determine whether the position of the wireless mobile device enters the set distance of the trading device or not; if the wireless mobile device enters the set distance, at least one electronic certification chosen from the electronic certification collection by the trading device is sent to the wireless mobile device through the wireless RF module.

11. The automatic electronic certification trading system of claim 10, wherein when the user of the wireless mobile device receives at least one electronic certification, the user can connect to the wireless RF module of the trading device through the wireless device and deliver the at least one electronic certification to the trading device.

12. The automatic electronic certification trading system of claim 10, further comprising more than one same type trading device, wherein the same type trading device comprises the same structure as the trading device; wherein when the user of the wireless mobile device receives at least one electronic certification, the user can connect to the wireless RF module of the trading device or any one of the same type trading devices through the wireless device, and deliver the at least one electronic certification to the trading device or the same type trading devices.

13. The automatic electronic certification trading system of claim 8 or 9 or 11 or 12, wherein when any one of the trading devices receives at least one electronic certification, the electronic certification is delivered to the electronic certification server, and the electronic certification server processes identity recognition or/and trading certification program corresponding to the at least one electronic certification.

14. The automatic electronic certification trading system of claim 8 or 9 or 11 or 12, further comprising a display indicating unit comprising a mobile phone, a tablet computer, a computer equipped with display, an electronic outfit, a display set on the trading device, wherein after the trading or recognition program, the display indicating unit shows the result of the trading or recognition visually.

15. The automatic electronic certification trading system of claim 8 or 9 or 11 or 12, further comprising an action receiver unit, wherein the action receiver unit comprises a communication module; after the trading or recognition program, the trading device sends control command to the action receiver unit according to the result of the trading or recognition via the wireless RF module of the trading device through wireless mobile network or wireless network.

16. The automatic electronic certification trading system of claim 8 or 9 or 11 or 12, further comprising an action indicating unit, wherein the action indicating unit comprises a processor, a communication module, and an automatic control output unit; wherein the action indicating unit acquires the result of the trading or recognition by communicating with the trading device through the communication module, and the automatic control output unit outputs control signal to outside according to the result of the trading or recognition.

17. The automatic electronic certification trading system of claim 8 or 9 or 11 or 12, wherein the set distance can be a certain value between 0.1 m to 30 m.

18. An automatic electronic certification trading system, comprising:
A Bluetooth trading device, wherein the Bluetooth trading device comprises: a processor, a wireless communication module, and a Bluetooth communication module;
a wireless mobile device, wherein the wireless mobile device comprises: a Bluetooth module and a wireless communication module; and
an electronic certification server, wherein the electronic certification server comprises an Internet communication module and stores electronic certification collection containing a plurality of electronic certification data;
wherein the Bluetooth trading device establishes connection with the electronic certification server via the wireless communication module of the Bluetooth trading device through wireless mobile network or wireless network, and the electronic certification collection data is acquired through the connection; wherein the wireless mobile device establishes connection with the electronic certification server via the wireless communication module of the wireless mobile device through wireless mobile network or wireless network and acquires at least one electronic certification through the connection; wherein when the user of the wireless mobile device receives at least one electronic certification, the user can establish Bluetooth connection with the Bluetooth communication module of the Bluetooth trading device through the Bluetooth module of the wireless mobile device and deliver the at least one electronic certification to the Bluetooth trading device; the verification of electronic certification is accomplished by the Bluetooth trading device processing the comparison of the electronic certification collection and the at least one electronic certification.

19. An automatic electronic certification trading system, comprising:
A Bluetooth trading device, wherein the Bluetooth trading device comprises: a processor, a wireless communication module, and a Bluetooth communication module; and
a wireless mobile device, wherein the wireless mobile device comprises: a Bluetooth module and a wireless communication module; and
an electronic certification server, wherein the electronic certification server comprises an Internet communication module and stores electronic certification collection containing a plurality of electronic certification data;
wherein the wireless mobile device establishes connection with the electronic certification server via the wireless communication module of the wireless mobile device through wireless mobile network or wireless network and acquires at least one electronic certification through the connection; wherein when the user of the wireless mobile device receives at least one electronic certification, the user can establish Bluetooth connection with the Bluetooth communication module of the Bluetooth trading device through the Bluetooth module of the wireless mobile device and deliver the at least one electronic certification to the Bluetooth trading device, the Bluetooth trading device forwards the electronic certification to the electronic certification server after receiving the at least one electronic certification, and the electronic certification server processes identity recognition or/and trading certification program corresponding to the at least one electronic certification.

20. The automatic electronic certification trading system of claim 19, wherein when the Bluetooth trading device forwards the electronic certification to the remote electronic certification server, the Bluetooth trading device can receive at least one updated electronic certification from the remote electronic certification server, and the updated electronic certification is delivered to the wireless mobile device through the Bluetooth trading device and the Bluetooth module of the wireless mobile device.

21. The automatic electronic certification trading system of claim 20, wherein the user of the wireless mobile device can establish Bluetooth connection with the Bluetooth trading device or any other Bluetooth trading device with the same function through the Bluetooth module of the wireless mobile device and deliver the updated electronic certification.

22. The automatic electronic certification trading system of claim 18 or 19, further comprising more than one wireless mobile device, wherein when a plurality of the users of the wireless mobile device receive at least one electronic certification, the users can establish a plurality of connections with the Bluetooth communication module of the Bluetooth trading device through the Bluetooth module of the wireless mobile device up to 40 Bluetooth physical connections, and each connection delivers the at least one electronic certification to the Bluetooth trading device.

23. The automatic electronic certification trading system of claim 18 or 19, further comprising a display indicating unit comprising a mobile phone, a tablet computer, a computer equipped with display, an electronic outfit, a display set on the trading device, wherein after the trading or recognition program, the display indicating unit shows the result of the trading or recognition visually.

24. The automatic electronic certification trading system of claim 18 or 19, further comprising an action receiver unit, wherein the action receiver unit comprises a communication module; after the trading or recognition program, the trading device sends control command to the action receiver unit according to the result of the trading or recognition via the wireless communication module of the Bluetooth trading device through wireless mobile network or wireless network.

25. The automatic electronic certification trading system of claim 18 or 19, further comprising an action indicating unit, wherein the action indicating unit comprises a processor, a communication module, and an automatic control output unit; wherein the action indicating unit acquires the result of the trading or recognition by communicating with the Bluetooth trading device through the communication module, and the automatic control output unit outputs control signal to outside according to the result of the trading or recognition.

* * * * *